United States Patent
Hisakawa et al.

(10) Patent No.: US 8,699,236 B2
(45) Date of Patent: Apr. 15, 2014

(54) CONDUCTIVE BUFFER MATERIAL AND DISPLAY DEVICE

(75) Inventors: Kohji Hisakawa, Osaka (JP); Hiroyuki Oonishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 382 days.

(21) Appl. No.: 13/258,547

(22) PCT Filed: Mar. 1, 2010

(86) PCT No.: PCT/JP2010/053206
§ 371 (c)(1), (2), (4) Date: Sep. 22, 2011

(87) PCT Pub. No.: WO2010/116817
PCT Pub. Date: Oct. 14, 2010

(65) Prior Publication Data
US 2012/0063113 A1    Mar. 15, 2012

(30) Foreign Application Priority Data

Apr. 6, 2009 (JP) .................................. 2009-091710

(51) Int. Cl.
*H05K 7/04* (2006.01)
*G02F 1/1333* (2006.01)

(52) U.S. Cl.
USPC ........................................... 361/807; 349/58

(58) Field of Classification Search
USPC .......... 361/679.21–679.3, 807; 345/169, 905; 349/58, 65; 348/794, 836; 248/176.1, 248/346.01, 225.21
See application file for complete search history.

(56) References Cited

U.S. PATENT DOCUMENTS

| 5,629,787 | A | * | 5/1997 | Tsubota et al. | 349/153 |
| 8,208,088 | B2 | * | 6/2012 | Zhang | 349/58 |
| 2006/0170347 | A1 | | 8/2006 | Kim et al. | |
| 2008/0058036 | A1 | * | 3/2008 | Nibe | 455/575.1 |

FOREIGN PATENT DOCUMENTS

| JP | 04-023380 U | 2/1992 |
| JP | 10-268783 A | 10/1998 |
| JP | 2004-093718 A | 3/2004 |
| JP | 2005-077590 A | 3/2005 |
| JP | 2006-201786 A | 8/2006 |
| JP | 2008-102173 A | 5/2008 |

OTHER PUBLICATIONS

Official Communication issued in International Patent Application No. PCT/JP2010/053206, mailed on Apr. 6, 2010.

* cited by examiner

*Primary Examiner* — Zachary M Pape
*Assistant Examiner* — Douglas Burtner
(74) *Attorney, Agent, or Firm* — Keating & Bennett, LLP

(57) ABSTRACT

A conductive buffer material (11) is one surface of a display panel (29) sandwiched between a first member (BZ1) and a second member (CS), and is interposed between a first panel surface facing the metallic first member (BZ1) and the first member (BZ1). The conductive buffer material (11) includes an inclusion material (15) and a conductive envelope material (14) that wraps the inclusion material (15), and the conductive buffer material (11) includes a main portion in which part of the envelope material (14) is brought closer to the first panel surface and the first member (BZ1) by the inclusion material (15) having a given thickness or more.

4 Claims, 6 Drawing Sheets

CONDUCTIVE BUFFER MATERIAL AND DISPLAY DEVICE

TECHNICAL FIELD

The present invention is related to a conductive buffer material such as a gasket, and a display device (for example, a liquid crystal display device) incorporating the conductive buffer material.

BACKGROUND ART

It is known that static electricity flows on the display surface of a liquid crystal display panel (a display panel) incorporated in a liquid crystal display device. It is also known that such static electricity degrades the quality of images displayed on the liquid crystal display panel. To cope with this problem, for example, in the display device disclosed in Patent Literature 1, as shown in FIG. 7, an elastic member 111 having conductivity is disposed between a liquid crystal display panel 129 and a front bezel bz1 which is made of metal and presses the liquid crystal display panel 129.

With this structure, even when static electricity e appears on the liquid crystal display panel 129, the static electricity e flows to the front bezel bz1. This helps prevent malfunction attributable to the static electricity e, such as degradation of display quality of the liquid crystal display panel 129.

CITATION LIST

Patent Literature

Patent Literature 1: JP-A-2004-93718

SUMMARY OF INVENTION

Technical Problem

However, the elastic member 111 is merely held by and between the front bezel bz1 and the liquid crystal display panel 129. Thus, for example, if the liquid crystal display device receives vibration and thereby the liquid crystal display panel 129 is displaced with respect to the front bezel bz1, the elastic member 111 may come off from between the front bezel bz1 and the liquid crystal display panel 129.

And, if the elastic member 111 comes off and moves around freely inside the liquid crystal display device, undesired electricity may be supplied to electronic components in the liquid crystal display device via the freely moving-around elastic member 111 (that is, a short circuit may occur in the electronic components).

The present invention has been made to solve the above problems. And, an object of the present invention is to provide a conductive buffer material or the like which securely prevents static electricity that flows on the display panel of a display device from flowing to the inside of the device.

Solution to Problem

According to one aspect of the present invention, a conductive buffer material is disposed between a first panel surface and a first member, the first panel surface being one surface of a display panel which is held between the first member and a second member, the first panel surface facing the first member which is made of metal. The conductive buffer material includes a filling member and an outer coat member which is conductive and wraps the filling member. The conductive buffer material includes a primary portion where part of the outer coat member is supported close to the first panel surface and the first member by the filling member having a thickness of a certain magnitude or greater.

Such a conductive buffer material is not a flat structure but includes a portion (the primary portion) having an increased thickness. Even when static electricity flows on the first panel surface, the provision of the primary portion between the first panel surface and the first member, which is made of metal, makes it possible to let the static electricity escape to the first member. Moreover, even if the outer coat member itself does not have a thickness of a certain magnitude or greater (for example, even if the outer coat member is formed as a comparatively thin sheet), the conductive buffer material can acquire a thickness of a certain magnitude or greater (for example, a thickness sufficient to fill the space between the first panel surface and the first member) merely by including the filling member. Thus, the production cost of the conductive buffer material is comparatively low.

According to another aspect of the present invention, a display device includes: the above-described conductive buffer material; a housing as the first member; a built-in chassis as the second member; and the display panel, the display panel being held between the built-in chassis and the housing which is made of metal.

In such a display device, the conductive buffer material includes a secondary portion which is formed of rest of the outer coat member that is out of contact with the filling member, the secondary portion having a smaller thickness than the primary portion. And preferably, the primary portion of the conductive buffer material is disposed between the display panel and the housing, and the secondary portion of the conductive buffer material is pressed against the housing by a boss protruding from the built-in chassis.

With this structure, the conductive buffer material is pressed by the boss against the housing, and thus is easily made stationary with respect to the housing. As a result, for example, the conductive member is less likely to come off and move.

It is preferable that the boss be fastened by a fixing member that is put therein from outside the housing.

With this structure, the secondary portion of the conductive buffer material is held between the housing and the boss with a greater force. As a result, the conductive member is further less likely to come off and move.

It is preferable that the conductive buffer material be provided corresponding to at least one of sides of the first panel surface.

This is for the following reason: even if static electricity flows on the first panel surface, it is possible to let the static electricity escape to the first member by merely providing the conductive buffer material along at least one side of the first panel surface.

Advantageous Effects of Invention

With the conductive buffer member of the present invention, even if, for example, static electricity flows on the display panel of the display device, it is possible to prevent the static electricity from flowing to the inside of the display device.

DESCRIPTION OF EMBODIMENTS

Embodiment 1

Figure 1:
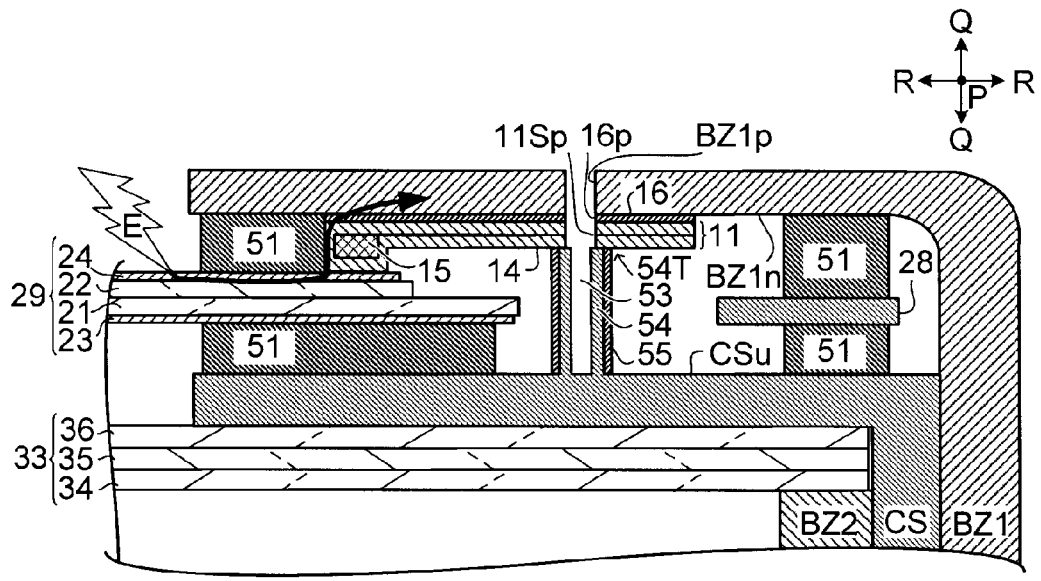
FIG. 1A sectional view taken along line A-A' in FIG. 4 and viewed from a direction indicated by an arrow in FIG. 4.

Hereinafter, an embodiment of the present invention will be described based on the drawings. Hatching, reference signs for members and the like may sometimes be omitted in a drawing for ease of description, and in such a case, a different drawing is to be referred to. A black dot in a drawing indicates a direction perpendicular to the sheet on which the drawing is drawn.

Figure 4:
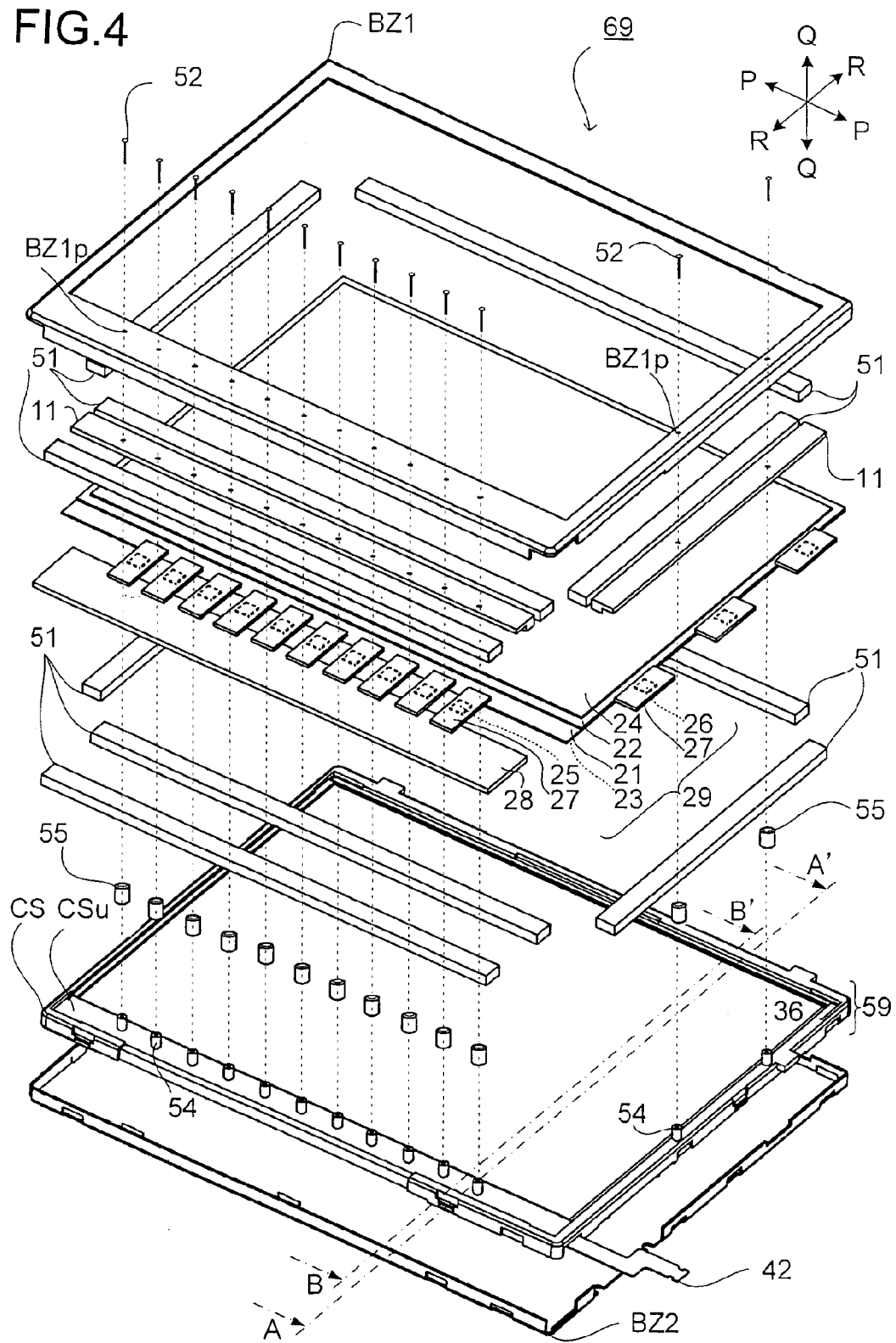
FIG. 4 An exploded perspective view showing a liquid crystal display device.

FIG. 4 is an exploded perspective view showing a backlight type liquid crystal display device 69. As shown in FIG. 4, the liquid crystal display device 69 includes a liquid crystal display panel 29 and a backlight unit 59 that supplies light to the liquid crystal display panel 29. Here, the liquid crystal display panel 29 and the backlight unit 59 are accommodated in a bezel BZ (a front bezel BZ1 and a rear bezel BZ2) that serves as an outer package.

The liquid crystal display panel 29 adopts an active matrix method. Thus, in the liquid crystal display panel 29, liquid crystal (not shown) is held between an active matrix substrate 21 to which active elements (unillustrated) such as TFTs (thin film transistors) are attached and a counter substrate 22 that faces the active matrix substrate 21. That is, the active matrix substrate 21 and the counter substrate 22 are substrates for holding the liquid crystal therebetween (here, a polarization film 23 is attached to a front surface 21U of the active matrix substrate 21 and a polarization film 24 is attached to a front surface 22U of the counter substrate 22).

To edges of a substrate surface of the active matrix substrate 21 that are not covered with the counter substrate 22, there are attached flexible substrates (for example, SOF; system on film) 27 having drivers (source drivers 25 and gate drivers 26) for controlling the TFTs mounted thereon.

Specifically, as the flexible substrate 27, for example, a plurality of flexible substrates 27 are coupled to one of long sides of the active matrix substrate 21 and to one of short sides of the active matrix substrate 21 (here, one end of each of the flexible substrates 27 having the source drivers 25 mounted thereon, the one end not being connected to the active matrix substrate 21, may be fitted to a rigid substrate 28).

Figure 5:
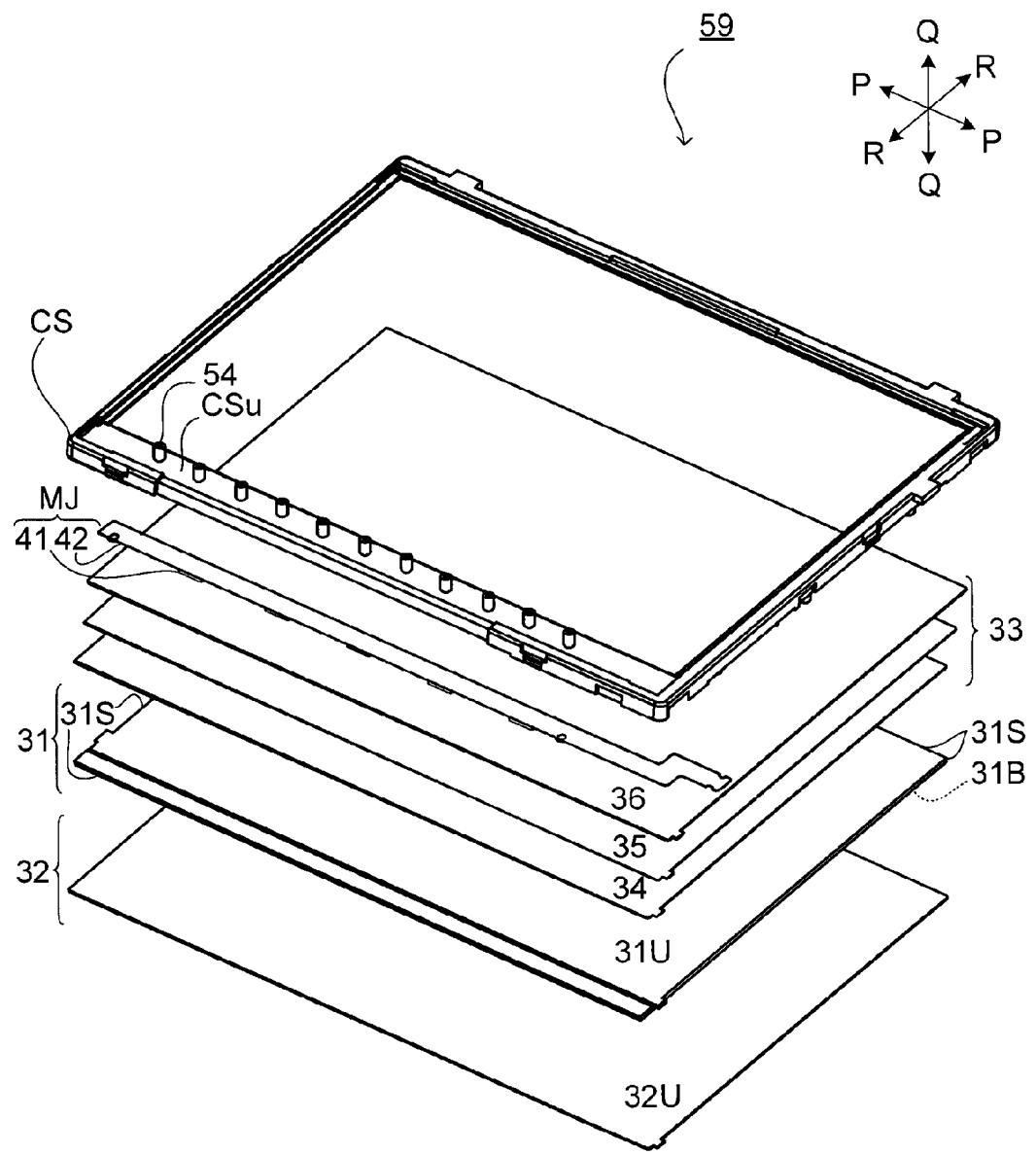
FIG. 5 An exploded perspective view showing a backlight unit having an LED as a light source.

Next, a description will be given of the backlight unit 59 that supplies light to the liquid crystal display panel 29. As shown in FIG. 5, the backlight unit 59 includes an LED module MJ, a light guide plate 31, a reflecting sheet 32, an optical sheet group 33 (a diffusion sheet 34, lens sheets 35, 36), and a built-in chassis CS.

The LED module MJ is a light emitting module and includes LEDs (light emitting diodes) 41 and an FPC (flexible printed circuits) substrate 42 on which the LEDs 41 are mounted.

The LEDs 41 are mounted on an electrode (unillustrated) formed on a mounting surface of the FPC substrate 42, and thereby receive electric current and emit light. It is preferable that the LEDs (light emitting elements, point light sources) 41 be mounted in line on the FPC substrate 42 (here, for the sake of convenience, just part of the LEDs 41 are illustrated in the figure, and the direction in which the LEDs 41 are aligned will be referred to as an alignment direction P).

The light guide plate 31 is a plate-shaped member having side surfaces 31S, a top surface 31U, and a bottom surface 31B, the top and bottom surfaces 31U and 31B being so positioned as to hold the side surfaces 31S therebetween. One of the side surfaces 31S (which functions as a light receiving surface) faces light emitting surfaces of the LEDs 41 and thereby receives light from the LEDs 41. The thus received light is repeatedly reflected inside the light guide plate 31, to be outputted through the top surface 31U as planar light.

The reflecting sheet 32 is located to be covered with the light guide plate 31. And, a surface of the reflecting sheet 32 facing the bottom surface 31B of the light guide plate 31 is a reflecting surface 32U. With this structure, the reflecting surface 32U reflects light from the LEDs 41 and light traveling inside the light guide plate 31 back into the light guide plate 31 without allowing leakage of such light.

The optical sheet group 33 includes the diffusion sheet 34 and the two lens sheets 35 and 36. Specifically, it can be said that the optical sheet group 33 is formed of a plurality of sheets, namely, the diffusion sheet 34, the lens sheet 35, and the lens sheet 36, which are stacked in this order.

The diffusion sheet 34 is located to cover the top surface 31U of the light guide plate 31, and the diffusion sheet 34 diffuses the planar light from the light guide plate 31 to deliver the light all over the liquid crystal display panel 29.

The lens sheets 35 and 36 are each, for example, an optical sheet that has a surface including a prism structure and that deflects radiation property of light, and the lens sheets 35 and 36 are positioned to cover the diffusion sheet 34 (specifically, the diffusion sheet 34 is covered with the lens sheet 35 and the lens sheet 35 is covered with the lens sheet 36). With this structure, the lens sheets 35 and 36 collect light beams coming from the diffusion sheet 34, and thereby improved brightness is achieved. Light beams collected by the lens sheet 35 and light beams collected by the lens sheet 36 are radiated from the lens sheets 35 and 36, respectively, in directions that cross each other.

The built-in chassis CS is a frame-shaped member for holding the above-described various members, and serves as a framework of the liquid crystal display device 69. Specifically, the built-in chassis CS holds the reflecting sheet 32, the light guide plate 31, and the optical sheet group 33 which are stacked in this order (incidentally, the direction in which the reflecting sheet 32, the light guide plate 31, and the optical sheet group 33 are stacked will be referred to as a stacking direction Q, and a direction that crosses (for example, at right angles) the alignment direction P and the stacking direction Q will be referred to as a crossing direction R).

Next, the bezel (housing) BZ will be described. The front bezel BZ1 and the rear bezel BZ2 which form the bezel BZ hold and fix therebetween the above-described backlight unit 59 and the liquid crystal display panel 29 that covers the backlight unit 59 (incidentally, the backlight unit 59 and the liquid crystal display panel 29 may be fixed by any method). That is, the front bezel BZ1 holds, together with the rear bezel BZ2, the backlight unit 59 and the liquid crystal display panel 29 therebetween, and thereby the liquid crystal display device 69 is completed.

In the backlight unit 59 structured as described above, light from the LEDs 41 is converted into planar light by the light guide plate 31 to be outputted therefrom, and the planar light travels through the optical sheet group 33 to be outputted as backlight light with improved emission brightness. And, the backlight light reaches the liquid crystal display panel 29, and by using the backlight light, the liquid crystal display panel 29 displays images.

Figure 2:
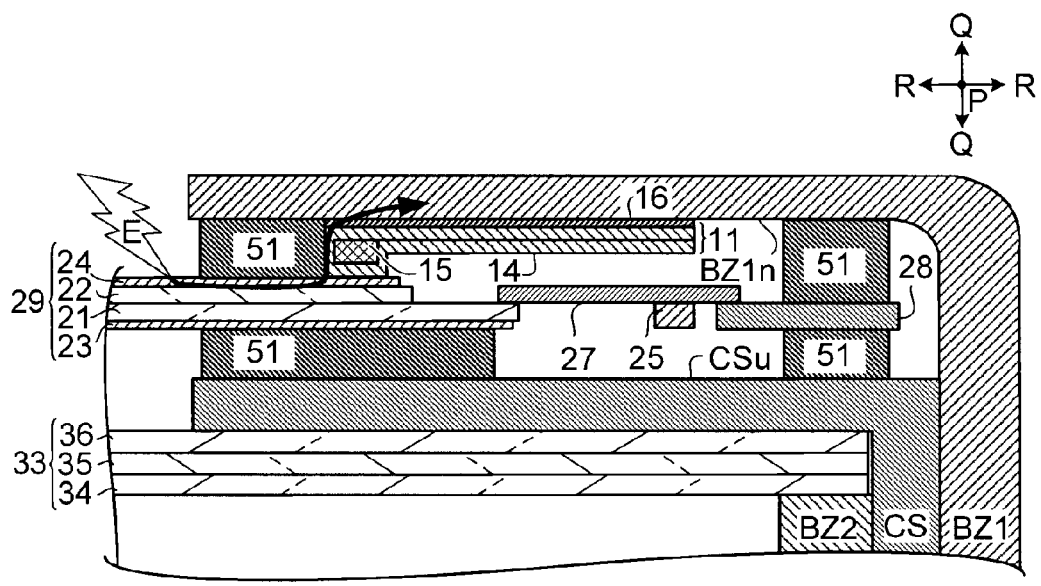
FIG. 2 A sectional view taken along line B-B' in FIG. 4 and viewed from a direction indicated by an arrow in FIG. 4.
Figure 3:
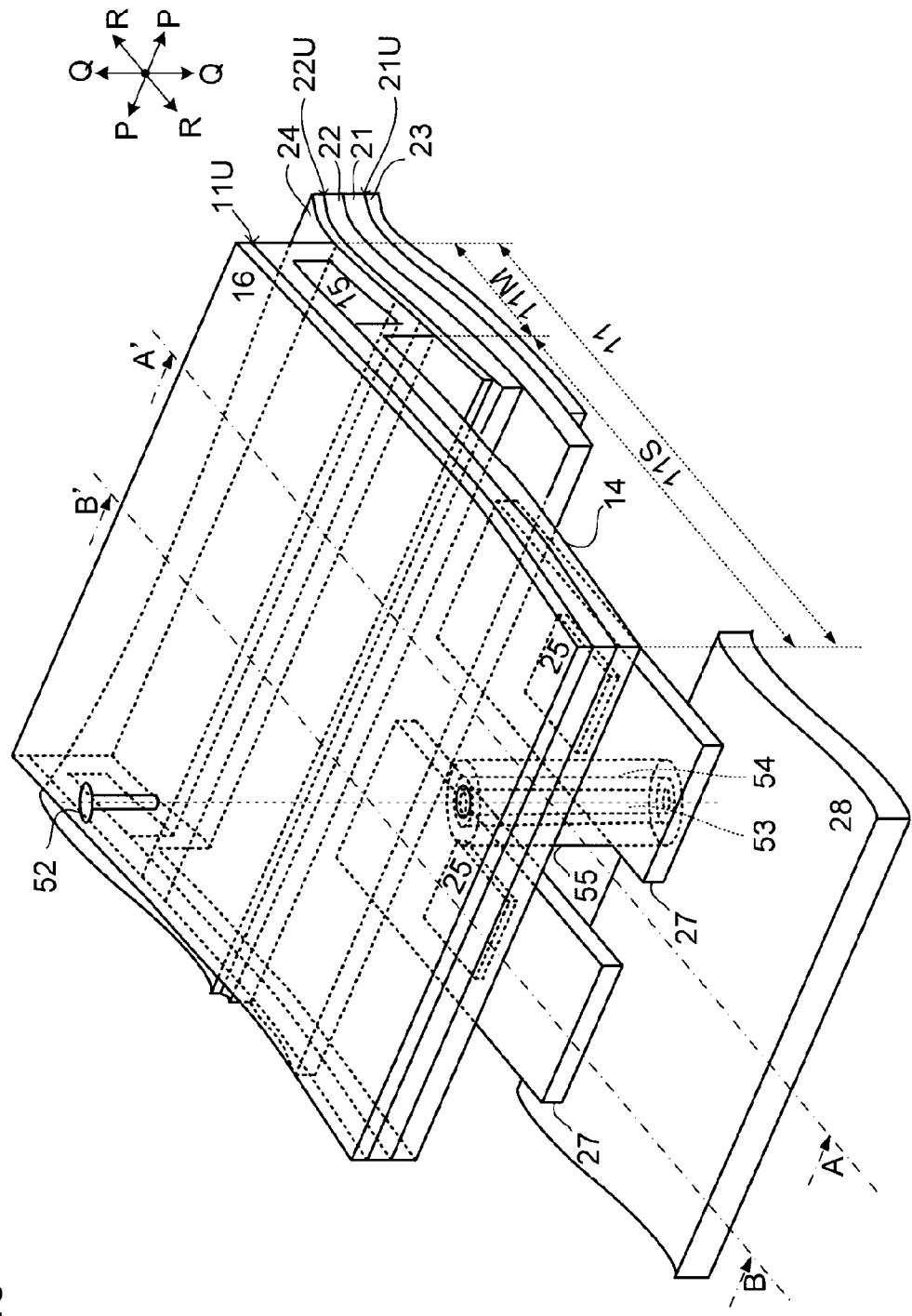
FIG. 3 A perspective view extracting and showing a gasket, etc.

The inner structure of the liquid crystal display device 69 is as shown in FIGS. 1 to 3. FIG. 1 is a sectional view taken along line A-A' in FIG. 4 and viewed from a direction indicated by an arrow in FIG. 4, and FIG. 2 is a sectional view taken along line B-B' in FIG. 4 and viewed from a direction indicated by an arrow in FIG. 4. FIG. 3 is a perspective view extracting and showing a gasket 11, etc. which will be described later (incidentally, for the sake of convenience, in FIG. 3, the built-in chassis CS is not shown, a later-described boss 54 is shown, and the front bezel BZ1 is not shown, in FIG. 3, lines A-A' and B-B' are also shown).

As shown in FIGS. 1 and 2, the liquid crystal display panel 29 is disposed between the front bezel (a first member) BZ1 and the built-in chassis (a second member) CS of the backlight unit 59. Specifically, the front bezel BZ1 presses the counter substrate 22 of the liquid crystal display panel 29 via an insulating buffer material 51, and the built-in chassis CS presses the active matrix substrate 21 of the liquid crystal display panel 29 via an insulating buffer member 51, and thereby the liquid crystal display panel 29 is held between the front bezel BZ1 and the built-in chassis CS.

The insulating buffer members 51 are, for example, blocks of urethane such as PORON (product by Rogers Inoac Corporation), and as shown in FIG. 4, arranged along the two long sides and the two short sides of the edges (the four sides) of the rectangle-shaped liquid crystal display panel 29.

With this structure, even if part of the front bezel BZ1 and part of the built-in chassis CS that face the edges of the counter substrate 22 and the edges of the active matrix substrate 21 have been processed with relatively low accuracy (specifically, for example, even if part of the front bezel BZ1 and part of the built-in chasses CS are wavy), the provision of the insulating buffer materials 51 allows the front bezel BZ1 and the built-in chassis CS to stably hold the liquid crystal display panel 29 therebetween.

Also, as shown in FIGS. 1 and 2, in the case where the rigid substrate 28 is located in the space formed by the front bezel BZ1 and the built-in chassis CS, the rigid substrate 28 may also be held between the front bezel BZ1 and the built-in chassis CS via an insulating buffer material 51.

For the liquid crystal display panel 29 to be mounted in the liquid crystal display device 69 in a more stable manner, it is necessary for the liquid crystal display panel 29 and the built-in chassis CS to be tightly engaged with each other (in other words, the liquid crystal display panel 29 and the built-in chassis CS need to hold the liquid crystal display panel 29 therebetween with a comparatively strong force). Hence, the front bezel BZ1 and the built-in chassis CS are fastened together with screws 52 (for convenience' sake, a ridge of each of the screws 52 and a groove formed in each of screw holes 53, which will be described later, are omitted in the figures).

Specifically, in part of the built-in chassis CS covered with the front bezel BZ1, for example, as shown in FIG. 1, in a counter surface CSu of the built-in chassis CS that faces an interior surface BZ1n of the front bezel BZ1, a boss 54 including the screw hole 53 is formed to protrude from the counter surface CSu (here, as shown in FIG. 3, the boss 54 is formed away from the flexible substrates 27). In the front bezel BZ1 facing the boss 54 (specifically, the screw hole 53), an aperture BZ1p is formed for the screw 52 to be put therethrough.

With this structure, in which, as shown in FIG. 4, the screws (fixing members) 52 are formed to be put through the apertures BZ1p from outside to be fitted into the screw holes 53 of the bosses 54, the front bezel BZ1 and the built-in chassis CS can be fastened together by the screws 52. That is, the screws 52 fasten the front bezel BZ1 and the built-in chassis CS to each other (here, preferably, a cylindrical cushion rubber 55 covers the outer circumference surface of each of the bosses 54 so as to prevent damage or the like which may result from the counter substrate 22 and the bosses 54 excessively coming into contact with each other).

Here, a detailed description will be given of how the gasket 11 is fixed to the liquid crystal display device 69 by using the bosses 54. First, a description will be given of the gasket 11.

As shown in FIGS. 1 to 3, the gasket (a conductive buffer material) 11 is a member formed by covering a sponge (a filling member) 15 with a conductive cloth member (an outer coat member) 14, and it lets static electricity E flowing on the liquid crystal display panel 29 escape to the front bezel BZ1, which is made of metal. Specifically, part of the cloth member 14 is wound around, to thereby wrap, the rod-shaped sponge 15, and facing parts of the cloth member 14 that are close to ends of the cloth member 14 and that are out of contact with the sponge 15 are brought into close contact with each other, and thereby the gasket 11 is completed.

Consequently, the gasket 11 includes a thick portion having a large thickness attributable to the thickness of the sponge 15 and a comparatively thin portion formed such that the parts of the cloth member 14 close to the ends thereof (the rest of the outer coat member) and facing each other are in close contact with each other. Thus, hereinafter, the part having the large thickness attributable to the thickness of the sponge 15 will be referred to as a primary portion 11M, and the portion formed only of the facing parts of the cloth member 14 close to the ends thereof, the portion thus having a thickness smaller than the thickness of the primary portion 11M, will be referred to as a secondary portion 11S (incidentally, a thickness direction of the sponge 15, which is a thickness direction of the gasket 11, is a direction along a surface perpendicular to an extension direction of the rod-shaped sponge 15 (that is, equivalent to the stacking direction Q).

Incidentally, as shown in FIGS. 1 and 2, the gasket 11 formed of the continuous primary and secondary portions 11M and 11S is shaped like alphabetic character "P" as viewed in a section taken perpendicular to an extension direction (a rod direction) of the sponge 15. And, a double-stick tape 16 is attached to the portion of the gasket 11 corresponding to the straight line of the "P" shape, that is, a flush surface (a stepless surface 11U; see FIG. 3) formed of a surface of the primary portion 11M and a surface of the secondary portion 11S that are continuous with each other. That is, the double-stick tape 16, which is disposed in a space between the stepless surface 11U and the front bezel BZ1 (specifically, the interior surface BZ1n), keeps the gasket 11 attached (bonded) to the front bezel BZ1.

The gasket 11, which is attached to the front bezel BZ1, as shown in FIGS. 1 and 2, maintains the primary portion 11M thereof in close contact with the insulating buffer material 51 held between the front surface 22U (specifically, the polarization film 24 on the front surface 22U) of the counter substrate 22 and the front bezel BZ1, the primary portion 11M filling a space between the front surface 22U of the counter substrate 22 and the interior surface BZ1n of the front bezel BZ1 (the point is that the primary portion 11M is thick enough to be in contact with both the front surface (a first panel surface) 22U of the counter substrate 22 and the interior surface BZ1n of the front bezel BZ1).

That is, in the gasket 11, the sponge 15 is formed to have a thickness of a certain magnitude or greater, and this allows the cloth member 14 to be supported close to the front surface 22U of the counter substrate 22 and the front bezel BZ1, which is made of metal. With this structure, if static electricity E flows on the polarization film 24 on the front surface 22U of the counter substrate 22, the static electricity E tends to flow along the polarization film 24 and further along the counter substrate 22 toward the inside of the liquid crystal display device 69, but actually, the static electricity E is led, as indicated by a very thick solid-line arrow, to flow to the gasket 11 which is located on the counter substrate 22 (incidentally, typically, the static electricity E is not very likely to flow through the insulating buffer material 51 disposed on the counter substrate 22).

Thus, since the gasket 11 is located close to the front bezel BZ1 which is made of metal, the static electricity E flows via the gasket 11 to the front bezel BZ1. As a result, the static electricity E is prevented from flowing to, for example, the flexible substrates 27, and thus no damage is caused by the static electricity E on various elements (a driver and the like) mounted on the flexible substrates 27.

Moreover, even if the cloth member 14 itself does not have a thickness of a certain magnitude or greater (for example, even if the cloth member 24 is formed as a comparatively thin sheet of cloth), the gasket 11 can acquire a thickness of a certain magnitude or greater (for example, a thickness sufficient to fill the space between the front surface 22U of the counter substrate 22 and the interior surface BZ1n of the front bezel BZ1) just by including the sponge 15. This makes it possible to produce the gasket 11 at comparatively low cost.

Now, in the case where the gasket 11 is bonded to the front bezel BZ1 only with the double-stick tape 16, degradation of adhesive strength of the double-stick tape 16 may cause the gasket 11 to come off (drop off) from the front bezel BZ1. Thus, to prevent the gasket 11 from coming off from the front bezel BZ1, the bosses 54 of the built-in chassis CS press the secondary portion 11S of the gasket 11 against the front bezel BZ1.

Specifically, between the built-in chassis CS and the front bezel BZ1 facing each other, the bosses 54 protrude from the counter surface CSu of the built-in chassis CS to such an extent that they almost reach the interior surface BZ1n of the front bezel BZ1. The point is that the bosses 54 have a length that is slightly shorter than the distance between the counter substrate CSu and the interior surface BZ1n. And between tips 54T of the bosses 54 and the interior surface BZ1n of the front bezel BZ1, the secondary portion 11S of the gasket 11 is disposed and thus is pressed by the bosses 54 against the front bezel BZ1 (the design here is such that the secondary portion 11S and the bosses 54 overlap with each other, with the primary portion 11M of the gasket 11 in close contact with the insulating buffer material 51).

With this structure, even if the adhesive strength of the double-stick tape 16 with which the gasket 11 is bonded to the front bezel BZ1 is degraded, the degradation does not cause the secondary portion 11S of the gasket 11, and thus the entire gasket 11, to come off from the front bezel BZ1. Thus, for example, even if vibration is applied to the liquid crystal display device 69 and thereby the liquid crystal display panel 29 is displaced with respect to the front bezel BZ1, the gasket 11, which has conductivity, does not move around inside the liquid crystal display device 69, and thus does not come into contact with the various electronic components incorporated in the liquid crystal display device 69. Thus, the static electricity E flowing to the gasket 11 does not further flow to any of the electronic components (the point is that the electronic components do not suffer damage attributable to electric current flowing via the gasket 11).

Incidentally, if the gasket 11 is in contact with both the counter substrate 22 and the front bezel BZ1 (specifically, if the gasket 11 is in (indirect) contact with the counter substrate 22 via the polarization film 24, and is also in contact with the front bezel 11), the static electricity E flowing on the counter substrate 22 flows via the gasket 11 to the front bezel BZ1. Thus, it is preferable that the primary portion 11M of the gasket 11 have a thickness of the same order of magnitude as the width of the space between the counter substrate 22 and the front bezel BZ1.

However, as long as at least one part of the gasket 11 (for example, at least the primary portion 11M) has a thickness of the same order of magnitude as the width of the space between the counter substrate 22 and the front bezel BZ1, there is no particular limitation to the thickness of the other parts of the gasket 11. However, if the secondary portion 11S, which is part of the gasket 11 but does not fill the space between the counter substrate 22 and the front bezel BZ1, is formed as thick as the primary portion 11M, the secondary portion 11S is likely to come into contact with the various electronic components inside the liquid crystal display device 69. To prevent this, it is preferable that the secondary portion 11S be less thick than the primary portion 11M.

Even if the secondary portion 11S is formed thin, as long as the bosses 54 are designed to have an appropriate length, the secondary portion 11S is securely held between the tips 54T of the bosses 54 and the interior surface BZ1n of the front bezel BZ1. Moreover, in the secondary portion 11S, apertures 11Sp are formed to each overlap a corresponding one of the screw holes 53 of the bosses 54, and further, in the double-stick tape 16 as well, apertures 16p are formed to each overlap a corresponding one of the screw holes 53 of the bosses 54 (here, note that the secondary portion 11S and the double-stick tape 16 are pressed by the bosses 54 against the front bezel BZ1, and thus the apertures 11Sp and 16p have an inner diameter smaller than the outer diameter of the bosses 54 (see FIG. 1)).

With this structure, the screws 52 are each fitted into the screw hole 53 of a corresponding one of the bosses 54 through a corresponding one of the apertures BZ1p of the front bezel BZ1, and further through a corresponding one of the apertures 16p of the double-stick tape 16 and a corresponding one of the apertures 11Sp of the secondary portion 11S. And, when the screws 52 are each screwed into a corresponding one of the bosses 54, the secondary portion 11S of the gasket 11 is held between the tips 54T of the bosses 54 and the interior surface BZ1n of the front bezel BZ1 further firmly. As a result, the gasket 11 is made securely stationary with respect to the front bezel BZ1.

Other Embodiments

It should be understood that the embodiments specifically described above are not meant to limit the present invention, and that many variations and modifications can be made within the spirit of the present invention.

For example, the above descriptions, which have been given based on FIGS. 1 to 3, have dealt with areas in the vicinity of the long side of the active matrix substrate 21 along which the flexible substrates 27 each having the source driver 25 mounted thereon are arranged. However, the gasket 11 fixed by the bosses 54 is not limited to be arranged close to the long side of the active matrix substrate 21.

For example, as shown in FIG. 4, the bosses 54 may be formed in the vicinity of the short side of the active matrix substrate 21 along which the flexible substrates 27 each having the gate driver 26 mounted thereon are arranged, and the gasket 11 may be pressed by the bosses 54 against the front bezel BZ1.

The bosses 54 may of course be provided corresponding to all the sides (the two long sides and the two short sides) of the active matrix substrate 21, and by thus provided bosses 54, the gasket 11 may be pressed against the front bezel BZ1 (the point is that the linear gasket 11 is arranged along at least one of the four sides of the active matrix substrate 21 (and thus the liquid crystal display panel 29), and the gasket 11 is pressed by the bosses 54 of the built-in chassis CS against the interior surface BZ1n of the front bezel BZ1).

In FIGS. 1 and 2, the gasket 11 is in contact with the counter substrate 22 (specifically, the polarization film 24) and the front bezel BZ1, but this is not meant as a limitation. For example, as long as the static electricity E coming from the counter substrate 22 is allowed to flow to the gasket 11 to further flow to the front bezel BZ1 from the gasket 11, the gasket 11 may be in close contact with, or away from, the counter substrate 22 and the front bezel BZ1.

Preferably, as shown in FIGS. 1 and 2, the insulating buffer material 51 and the gasket 11, which are arranged on the front surface 22U of the counter substrate 22, are in close contact with each other. With this structure, by arranging the gasket 11 such that the length thereof extends along the length of the insulating buffer material 51, the gasket 11 can be located more accurately, and further, the gasket 11 can be easily fitted to the front bezel BZ1 (the point is that the insulating buffer material 51 functions as a positioning member for the gasket 11). This helps improve the production efficiency of the liquid crystal display device 69. However, it is not essential for the insulating buffer material 51 and the gasket 11 to be in close contact with each other.

In FIG. 1, the aperture 16p and the aperture 11Sp are formed in the double-stick tape 16 and the secondary portion 11S of the gasket 11, respectively, for the screw 52 to pass therethrough. This, however, is not meant as a limitation. For example, if, in the course of the screw 52 being tightened, the screw 52 opens a hole in the double-stick tape 16 and the secondary portion 11S as it is screwed into the double-stick tape 16 and the secondary portion 11S to be fitted into the screw hole 53 of the boss 54, the apertures 16p and 11Sp of the double-stick tape 16 and the secondary portion 11S, respectively, are not necessary.

Figure 6:
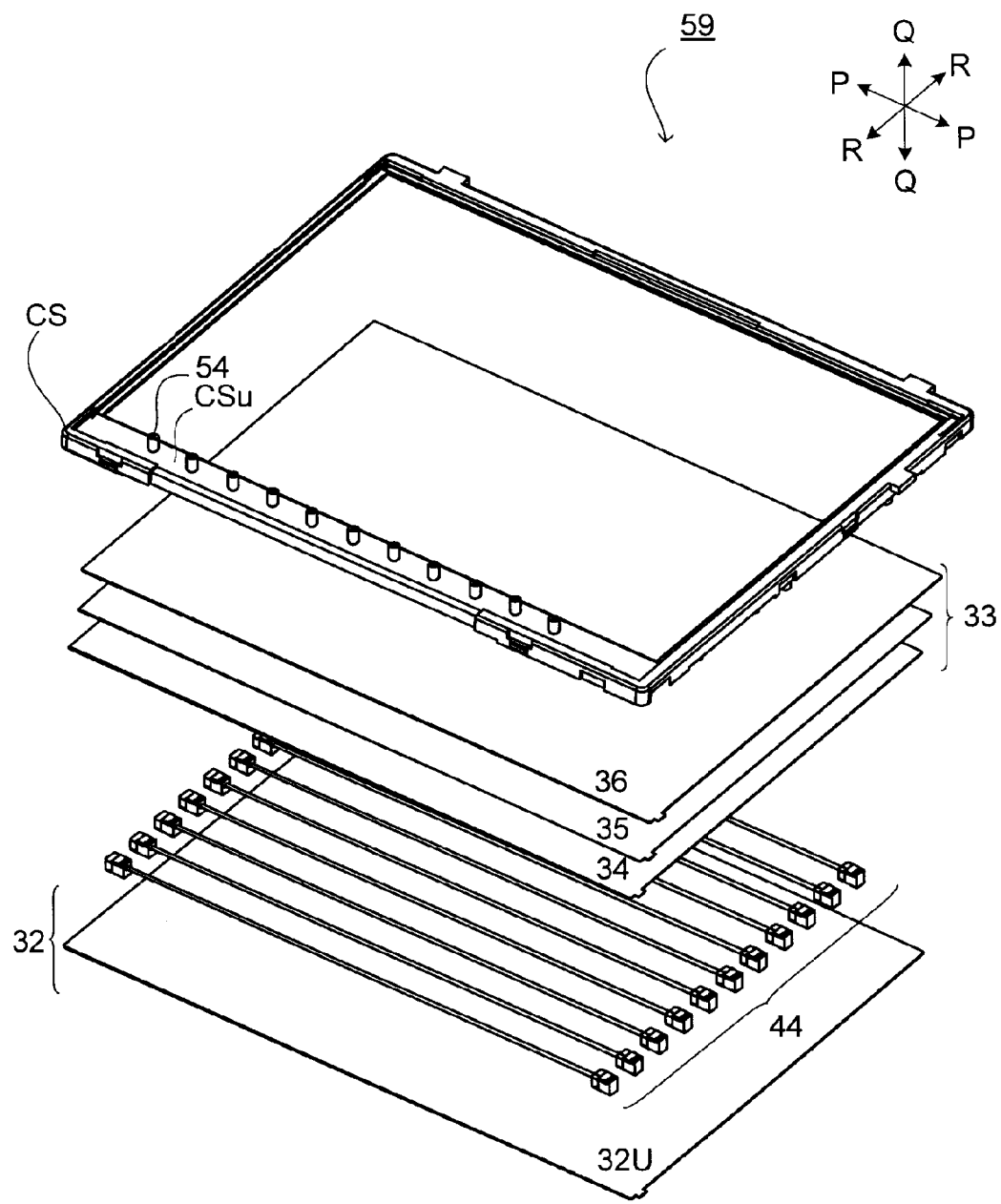
FIG. 6 An exploded perspective view showing a backlight unit having a fluorescent tube as a light source.
Figure 7:
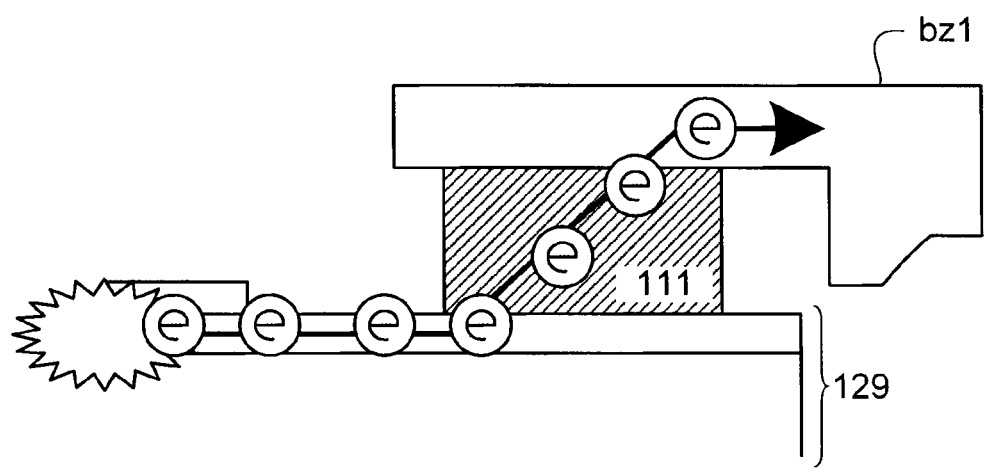
FIG. 7 A sectional view showing part of a conventional liquid crystal display device.

The above descriptions have dealt with the LEDs 41 as an example of the light source of the backlight unit 59, but this is not meant as a limitation; for example, as shown in FIG. 6, fluorescent tubes 44 may be adopted as the light source (in FIG. 6, however, for the sake of convenience, the fluorescent tubes 44 are shown only partially). The backlight unit 59 shown in FIG. 6, in which a plurality of fluorescent tubes 44 are arranged side by side like columns between the diffusion sheet 34 and the reflection sheet 32, is called a direct backlight unit 59.

The direct backlight unit 59 emits a comparatively large amount of light (backlight light), and thus it is often adopted in comparatively large liquid crystal display devices 69. Incidentally, there is no particular limitation to the kind of the fluorescent tubes 44, and they may be cold cathode tubes or hot cathode tubes. The backlight unit 59 incorporating the fluorescent tubes 44 is not limited to be of direct type, and it may be a side-light type in which the fluorescent tubes 44 are arranged at a side surface 31S of the light guide plate 31.

The liquid crystal display device 69 has been dealt with above as an example of the display device, but this is not meant as a limitation; for example, an organic EL (electroluminescence) display device or a plasma display device maybe used instead.

LIST OF REFERENCE SYMBOLS 11 gasket (conductive buffer material)
11M primary portion of gasket
11S secondary portion of gasket
11Sp aperture formed in secondary portion for screw
14 cloth member (outer coat member)
15 sponge (filling member)
16 double-stick tape
16p aperture formed in the double-stick tape for screw
21 active matrix substrate
21U front surface of active matrix substrate
22 counter substrate
22U front surface of counter substrate (first panel surface)
23 polarization film
24 polarization film
25 source driver
26 gate driver
27 flexible substrate
28 rigid substrate
29 liquid crystal display panel
31 light guide plate
33 optical sheet group
MJ LED module
41 LED (light source)
44 fluorescent tube (light source)
49 liquid crystal display panel (display panel)
51 insulating buffer material
52 screw (fixing member)
53 screw hole
54 boss
54T tip of boss
59 backlight unit (illuminating device)
CS built-in chassis (second member)
CSu counter surface of built-in chassis
BZ1 front bezel (housing, first member)
BZ1n interior surface of the front bezel
BZ2 rear bezel (housing)
69 liquid crystal display device (display device)

The invention claimed is:

1. A conductive buffer material disposed between a first panel surface and a first member, the first panel surface being one surface of a display panel which is held between the first member and a second member, the first panel surface facing the first member which is made of metal,
the conductive buffer material, comprising:
a filling member; and
an outer coat member which is conductive and wraps the filling member, wherein
the conductive buffer material includes a primary portion where part of the outer coat member is supported close to the first panel surface and the first member by the filling member having a thickness of a certain magnitude or greater and;
a display device, comprising:
said conductive buffer material;
a housing as the first member;
a built-in chassis as the second member; and
the display panel, wherein the display panel is held between the built-in chassis and the housing which is made of metal;
the conductive buffer material includes a secondary portion which is formed of the rest of the outer coat member that is out of contact with the filling member, the secondary portion having a smaller thickness than the primary portion;

the primary portion of the conductive buffer material is disposed between the display panel and the housing; and the secondary portion of the conductive buffer material is pressed against the housing by a boss protruding from the built-in chassis.

2. The display device of claim 1, wherein the boss is fastened by a fixing member that is put therein from outside the housing.

3. The display device of claim 1, wherein the conductive buffer material is provided corresponding to at least one of sides of the first panel surface.

4. The display device of claim 2, wherein the conductive buffer material is provided corresponding to at least one of sides of the first panel surface.

\* \* \* \* \*